US011570412B2

(12) United States Patent
Surati et al.

(10) Patent No.: US 11,570,412 B2
(45) Date of Patent: Jan. 31, 2023

(54) SYSTEM AND METHOD FOR PROVIDING IMPROVED DISPLAY QUALITY BY DISPLAY ADJUSTMENT AND IMAGE PROCESSING USING OPTICAL FEEDBACK

(71) Applicant: Scalable Display Technologies, Inc., Cambridge, MA (US)

(72) Inventors: Rajeev J. Surati, Cambridge, MA (US); Samson J. Timoner, Cambridge, MA (US); Kevin Amaratunga, Belmont, MA (US); Thomas F. Knight, Jr., Belmont, MA (US)

(73) Assignee: Scalable Display Technologies, Inc., Cambridge, MA (US)

( * ) Notice: Subject to any disclaimer, the term of this patent is extended or adjusted under 35 U.S.C. 154(b) by 0 days.

(21) Appl. No.: 17/510,125

(22) Filed: Oct. 25, 2021

(65) Prior Publication Data
US 2022/0116572 A1   Apr. 14, 2022

Related U.S. Application Data

(63) Continuation of application No. 16/730,100, filed on Dec. 30, 2019, now Pat. No. 11,159,774, which is a
(Continued)

(51) Int. Cl.
*H04N 9/31* (2006.01)
*H04N 5/74* (2006.01)

(52) U.S. Cl.
CPC ............. *H04N 9/3182* (2013.01); *H04N 5/74* (2013.01); *H04N 9/3147* (2013.01); *H04N 9/3194* (2013.01)

(58) Field of Classification Search
CPC ...... H04N 9/3182; H04N 5/74; H04N 9/3147; H04N 9/3194; G09G 3/20
See application file for complete search history.

(56) References Cited

U.S. PATENT DOCUMENTS

| 5,381,349 A | 1/1995 | Winter |
| 5,574,473 A | 11/1996 | Sekiguchi |

(Continued)

FOREIGN PATENT DOCUMENTS

| EP | 0982934 A2 | 3/2000 |
| JP | H04199477 A | 7/1992 |

(Continued)

*Primary Examiner* — Abhishek Sarma
(74) *Attorney, Agent, or Firm* — Loginov & Associates, PLLC; William A. Loginov (57) ABSTRACT

This invention provides an improved display system and method that is created by adjusting the properties of one or more displays to obtain coarse control over display behavior, by using sensors to optimize display parameters. The display is further improved by constructing a display map by selectively driving the display and sensing the optical image created. Furthermore, the sensors are used to ensure that the resulting optimized display meets target quality measurements over time, potentially taking into account ambient conditions. The system reports on its status, and is able to predict when the system will no longer meet a quality target. The system and method is able to optimize a display system and keep it optimized over time. Individual displays with the display system can have operating points that are matched to each other. Corrections to the input image signal to deliver improved display system performance can be minimized, and therefore, the unwanted artifacts of those changes can be minimized. If the displays drift over time, those operating points can be updated. If ambient conditions change, and new operating points are desired, the new operating points can be automatically selected. Operators of the display who require a minimum level of quality for the display system (e.g. a minimum intensity level) can be ensured that the display meets those requirements. And, they can be warned in advance as to when system maintenance can be necessary, when quality falls below targeted goals system and method (Continued)

provides for sending out methods of the quality of the system such an in an e-mail, perhaps in the form of graphs. Or, the system in method allows for prediction of when quality targets will not be met. Prediction is useful for a display system operator who needs to know when to perform maintenance, such as changing a light bulb (light source) in a projector.

16 Claims, 7 Drawing Sheets

Related U.S. Application Data continuation of application No. 14/673,804, filed on Mar. 30, 2015, now Pat. No. 10,523,910, which is a continuation of application No. 12/049,267, filed on Mar. 14, 2008, now Pat. No. 8,994,757.

(60) Provisional application No. 60/895,070, filed on Mar. 15, 2007.

(56) References Cited

U.S. PATENT DOCUMENTS

| | | | |
|---|---|---|---|
| 5,617,259 A | 4/1997 | Inoue | |
| 6,456,339 B1 | 9/2002 | Surati | |
| 6,520,647 B2 | 2/2003 | Raskar | |
| 6,527,395 B1 | 3/2003 | Raskar | |
| 6,677,956 B2 | 1/2004 | Raskar | |
| 6,709,116 B1 | 3/2004 | Raskar | |
| 6,715,888 B1 | 4/2004 | Raskar | |
| 6,729,733 B1 | 5/2004 | Raskar | |
| 6,733,138 B2 | 5/2004 | Raskar | |
| 6,755,537 B1 | 6/2004 | Raskar | |
| 6,764,185 B1 | 7/2004 | Beardsley | |
| 6,781,591 B2 | 8/2004 | Raskar | |
| 6,793,350 B1 | 9/2004 | Raskar | |
| 6,811,264 B2 | 11/2004 | Raskar | |
| 6,834,965 B2 | 12/2004 | Raskar | |
| 6,935,754 B2 | 8/2005 | Salvatori | |
| 7,001,023 B2 | 2/2006 | Lee | |
| 7,068,263 B2 | 6/2006 | Evanicky | |
| 7,131,733 B2 | 11/2006 | Shibano | |
| 7,137,707 B2 | 11/2006 | Beardsley | |
| 7,154,395 B2 | 12/2006 | Raskar | |
| 7,242,818 B2 | 7/2007 | Beardsley | |
| 7,252,387 B2 | 8/2007 | Raskar | |
| 7,292,269 B2 | 11/2007 | Raskar | |
| 7,355,583 B2 | 4/2008 | Beardsley | |
| 7,421,111 B2 | 9/2008 | Dietz | |
| 7,742,028 B2 | 6/2010 | Nitta | |
| 2001/0013904 A1 | 8/2001 | Kubota | |
| 2002/0109655 A1 | 8/2002 | Yer | |
| 2003/0067587 A1 | 4/2003 | Yamasaki | |
| 2005/0117126 A1 | 6/2005 | Miyazawa | |
| 2005/0253835 A1 | 11/2005 | Kawase | |
| 2005/0280605 A1 | 12/2005 | Tsao | |
| 2006/0033890 A1 | 2/2006 | Hasegawa | |
| 2007/0047043 A1 | 3/2007 | Kapellner | |
| 2008/0024683 A1* | 1/2008 | Damera-Venkata | H04N 9/3194 348/383 |
| 2008/0094426 A1 | 4/2008 | Kimpe | |
| 2008/0143969 A1 | 6/2008 | Aufranc | |
| 2009/0147031 A1* | 6/2009 | Miyazawa | G03B 33/12 353/30 |
| 2011/0234921 A1* | 9/2011 | Ivashin | H04N 9/3147 348/E3.048 |
| 2012/0206343 A1 | 8/2012 | Plut | |

FOREIGN PATENT DOCUMENTS

| | | |
|---|---|---|
| JP | H0583660 A | 4/1993 |
| JP | H06178336 | 6/1994 |
| JP | H06195048 A | 7/1994 |
| JP | 07098574 A | 4/1995 |
| JP | H0854855 A | 2/1996 |
| JP | H1031730 A | 2/1998 |
| JP | 2005077892 B1 | 3/2000 |
| JP | 2001133362 A | 5/2001 |
| JP | 2001222265 A | 8/2001 |
| JP | 2001525564 A | 12/2001 |
| JP | 2002238064 | 8/2002 |
| JP | 2003195417 A | 7/2003 |
| JP | 2003524915 A | 8/2003 |
| JP | 2003263138 A | 9/2003 |
| JP | 2005077892 A | 3/2005 |
| JP | 2005244835 A | 9/2005 |
| JP | 2005337797 A | 12/2005 |
| JP | 2006014146 A | 1/2006 |
| JP | 2006098671 A | 4/2006 |
| JP | 2006109168 A | 4/2006 |
| JP | 2006184305 A | 7/2006 |
| JP | 2006276343 A | 10/2006 |
| JP | 2006284718 A | 10/2006 |
| JP | 2006284931 A | 10/2006 |
| JP | 2007011246 A | 1/2007 |
| JP | 2007536766 A | 12/2007 |
| JP | 2008533501 A | 8/2008 |
| JP | 2010260109 A | 11/2010 |
| KR | 100384974 B1 | 5/2003 |
| KR | 20060046635 A | 5/2006 |
| WO | 0007376 A1 | 2/2000 |
| WO | 2005015904 | 2/2005 |
| WO | 2006100991 | 9/2006 |

* cited by examiner

SYSTEM AND METHOD FOR PROVIDING IMPROVED DISPLAY QUALITY BY DISPLAY ADJUSTMENT AND IMAGE PROCESSING USING OPTICAL FEEDBACK

RELATED APPLICATION

This invention claims the benefit of U.S. Provisional Application Ser. No. 60/895,070, entitled SYSTEM AND METHOD FOR PROVIDING IMPROVED DISPLAY QUALITY BY PROJECTOR ADJUSTMENT AND COMPUTERIZED GRAPHICAL PROCESSING USING OPTICAL FEEDBACK, by Rajeev J. Surati, et al, the teachings of which are expressly incorporated herein by reference.

FIELD OF THE INVENTION

This invention is related to graphical displays and more particularly to improvements in image quality in one or more displays.

BACKGROUND OF THE INVENTION

People love to see dynamic imagery all around them. The bigger, the brighter, the higher resolution, and the more inexpensive these displays are, the better. Today this translates to digital cinema and immersive virtual reality systems that provide a realistic visual experience. While the computational power necessary to make these systems a reality is widely available today, the required very high-quality displays are not.

A display generally consists of one of more light sources, and a method of spatially modulating the light. For example, many displays have one or more light sources (such as an LED, Laser, High Pressure Mercury lamp, Xenon Lamp, etc.), and one or more spatial light modulator(s) such as an LCD chip, LCOS chip, micromechanical mirror chip (such as the Texas Instrument's DLP), some number of lenses and/or mirrors, etc. Other displays are emissive and effectively have a light source at each pixel, such as plasma or LCD panels.

Some projection displays ("projectors") use one, or a plurality of moving mirrors or an equivalent way to steer light. The mirror moves in time, steering the light spatially. The light source is then modulated in synchrony, so that each target location receives different amounts of light. This type of projector is often built with lasers. If the movement of the light is sufficiently rapid, then the eye does not realize that a beam is being rasterized.

Other types of displays include CRT display projectors, which modulate an electron beam, which thereby converts into modulated light. In other cases the screen, or regions very close to the screen, are patterned. Changes in the pattern selectively block or allow light such as you might with patterned liquid crystals.

In general the display types currently available include liquid crystal, plasma, DLP, Laser, LCOS, and others. All these displays exhibit different kinds of in-factory and post-factory-introduced defects. Thus, there is a need to provide the best quality display a user might want given a given display's capabilities. The type of correction required often depends on the environment of the display such as the ambient lighting surrounding the display, or its positions amongst a plurality of displays. To this end, reference is made to U.S. Pat. No. 6,456,339, entitled SUPER-RESOLUTION DISPLAY by Rajeev J. Surati, et al., the teachings of which are expressly incorporated herein by reference. As described further below, this patent describes a novel approach for seamlessly stitching together the projected image derived from a plurality of projectors, each handling a portion of the overall image fed from a source (a PC for example). A camera that monitors the overall image, feeds information back to the PC and its onboard image processing applications, and is used to appropriately arrange, align and smooth the individual, overlapping images from the adjacent projectors. This produces an overall image that is properly aligned and substantially uniform in color and intensity. However, further improvements to the image quality in this arrangement are particularly desirable.

The state of the art in multiple-projector displays is well summarized by *Practical Multi-Projector Display Design* by Majunder and Brown, © 2007, published by A. K. Peters. In that book, Majunder and Brown discuss the various ways to find ways to modify the source images going into a projector, so that they look perfect on a screen. Those modifications include warping and mapping the color and intensity of a portion of the image to a different color/intensity so that the result appears uniform (or nearly so). Majunder and Brown focus on the numerous ways to calculate the warping or the quality functions to maximize in order that a multiple projector system appears uniform to the eye. However, neither they nor any of the many papers they reference actually contemplate changing the coarse parameters accessible in the projector, such as contrast, brightness and lens shift.

While the state of the art in multiple projector displays often modifies the input signal to a projector, factory calibration of individual displays generally modifies only the gross settings on a display without modifying the input signal. Furthermore, when many displays are ganged together, their gross settings are generally not changed to be consistent with each other.

Current systems exhibit numerous disadvantages and operational challenges. The gross settings of ganged-together displays are set individually, and generally not set to match each other. It would be desirable if the ganged-together displays provided a consistent appearance with respect to each other. And, as the properties of the displays drift over time, it is desirable to update those settings to maintain display quality. Some display systems have quality targets which must be met, and not just on the day the system was installed. The operator of these displays would benefit greatly from regular feedback indicating when the quality targets are being met and/or when maintenance is necessary. And, moreover, the operator would benefit from advanced notice of when maintenance will be necessary. The modification of the input signal causes unwanted artifacts, such as resampling artifacts, or a decrease in the dynamic range of the system. It would be desirable to minimize those effects. A change in ambient conditions may affect the operation of the display, and it is desirable to automatically accommodate for those changes. Additionally, ambient changes, such as light falling on the display, may render a brighter display system more desirable, even while permitting reduced color accuracy. It would be desirable if the system could automatically adjust itself. In general, it would be desirable to address a variety of concerns pertaining to display systems.

SUMMARY OF THE INVENTION

This invention overcomes disadvantages of the prior art by providing an improved display system and method that is created by adjusting the properties of one or more displays to obtain coarse control over display behavior, by using sensors to optimize display parameters. The display is further improved by constructing a display map by selectively driving the display and sensing the optical image created. Furthermore, the sensors are used to ensure that the resulting optimized display meets target quality measurements over time, potentially taking into account ambient conditions. Additionally, the system reports on its status, and is able to predict when the system will no longer meet a quality target.

Taken as a whole, the illustrative system and method is able to optimize a display system and keep it optimized over time. Individual displays with the display system can have operating points that are matched to each other. Corrections to the input image signal to deliver improved display system performance can be minimized, and therefore, the unwanted artifacts of those changes can be minimized. Further, if the displays drift over time, those operating points can be updated. If ambient conditions change, and new operating points are desired, the new operating points can be automatically selected. Operators of the display who require a minimum level of quality for the display system (e.g. a minimum intensity level) can be ensured that the display meets those requirements. And, they can be warned in advance as to when system maintenance can be necessary, when quality falls below targeted goals.

In an illustrative embodiment the system and method provides for automatically modifying both the input signal to the display system (using the pixel correction function), and modifying the operating point of the display (using the display quality correction function to change the display's variable OMTE parameters). Taken together, the display system can optimize a measure of quality, while minimizing the artifacts that can be caused by modifying the input signal to a display (such as reduced dynamic range and re-sampling artifacts).

In an illustrative embodiment, the system and method provides for providing data from the sensors, and quantities derived from it to a third party. That data provides the third party the knowledge to that display system in fact meets the quality targets that are desired. Moreover, the illustrative system and method not only provides for data from the sensors and quantities derived from it, but uses that data to predict when a quality target will no longer be met. Thus, a display system operator can be warned in advance when light sources need to be replaced or other system maintenance will be necessary.

The illustrative system and method also provides for redundancy. The sensors can detect when one display in a plurality of displays is functioning poorly and turning-on another display to replace, largely replace, or augment the poorly performing display. The system and method further provides for using sensors to match the operating points (OMTE parameters/display correction function) of each display in a plurality of displays that are ganged together. Thus, rather than having each display calibrated to a standard—as can happen in a factory—the displays are calibrated to each other, making a display system that has higher quality than displays calibrated separately.

The system and method further provides for storing the pixel correction and the display quality correction functions (OMTE parameters). Storing the functions allows multiple operating points in the system should multiple operating points be desired.

The system and method further provides for sensing ambient conditions. Thus, the operating point of the display can be based on ambient conditions. As an example as to why this can be desirable: one operating point can optimize the system when sunlight falling is falling upon display surface, another operating point can optimize the system at night. Also, sometimes the ambient conditions affect the performance of the display, which would mean that a different operating point of the display is desired at different ambient conditions. Furthermore, as the operating points can be stored, the system and method further provides for recalling different operating points at different ambient conditions.

The system and method further provides the same functionality in system comprising individual displays and plurality of displays. Generally, pluralities of displays are used to generate an overall display (e.g. a large image across many displays, or many separate images that are shown at the same time).

The system and method additionally provides the ability of to reduce the artifacts incurred by modifying the input signal to a display system. It does so by using the display quality correction function. It further allows the reduction of artifacts by allowing a spatial varying pixel correction function. As an example of why this is desirable, consider a ganged plurality of projectors where one region of the system is showing text. The effects of re-sampling text in the pixel correction function can be unacceptable, so it can be desirable to avoid re-sampling in a particular region. Alternatively, a sharpening filter in that region can improve the quality of the text.

In alternate embodiments of the system and method, there may exist an inability is unable to automatically set an MATE parameter. In this case, the system and method further allows for a third party operator (such as a human) to manually modify the OMTE parameter.

The system and method further provides for the ability to providing key data about the system to a third party. That data can include quality metrics such as how bright the display is, or that someone inappropriately changed an OMTE parameter. The system and method provides for sending out methods of the quality of the system such an in an e-mail, perhaps in the form of graphs. Or, the system in method allows for prediction of when quality targets will not be met. Prediction is useful for a display system operator who needs to know when to perform maintenance, such as changing a light bulb (light source) in a projector.

BRIEF DESCRIPTION OF THE DRAWINGS

The invention description below refers to the accompanying drawings, of which.

DETAILED DESCRIPTION

A. Sensors

By way of further background, to capture information as to the quality of the image, the system of this invention utilizes one or more light sensors. A sensor can be defined in a variety of ways and can be one of many different types, including cameras, linear arrays of light sensors, and light sensors with no inherent spatial information, such as a photo-diode. Sometimes the system requires many sensors, and sometimes it requires only one. The sensor(s) may detect infrared, ultraviolet, or visible light in either narrow or broad-wavelength bands. It/they may be sensitive to position, as an imaging camera, or insensitive to position, as a single light level sensing photodiode. Some sensors, like camera(s), may provide a sense of the three-dimensional geometry of the system.

Note that even very simple light sensors provide significant amounts of information when used in conjunction with displays/projectors, including color, intensity and spatial information, when combined with the ability to control the image projected on one or more of the projectors. Significantly, the system can control and sense the display/projector and light sensors at the same time. A single photo-diode can be used to obtain spatial information by progressively turning on and off neighboring pixels in a display and determining which ones illuminate the diode. Partial hits will show up as lower intensity than full hits. Using this technique, the system obtains spatial information. One can compare the intensity of projectors using a single diode by locating the diode in the light path of two projectors and sequentially turning on each projector. The illustrative system can match the color performance of two projectors by illuminating the diode with colored light from each projector and comparing the sensed light intensity. One can similarly match the performance of two light sensors by having light from the same display be captured by multiple sensors.

B. Displays

The system is generally adapted to (but not necessarily limited to) light sensor(s) and display/projector(s) feedback systems. These are systems typically consist of one or more displays and one or more light sensors. The light sensors provide feedback to control the inputs to the displays to achieve a desired result. Note, that by "display" it is meant any system that provides a visual image that can be viewed by the user. By "ganged display" it is meant a plurality of displays located in proximity to each other that generally show related images or components of the same image. Similarly, the term "self-contained" displays refers to displays which include a pre-defined screen surface—such as plasma displays, LCD flat panels, and rear projection televisions. These types of displays can be tiled with the screen surfaces abutting or with a gap in between. We also refer to displays with a "separated" screen surface. The screen need not be a purpose-built structure, but any surface upon which a projected image can be viewed. These displays with a separated screen are typically projectors and can include overlaps of the displays.

C. System

Figure 1:
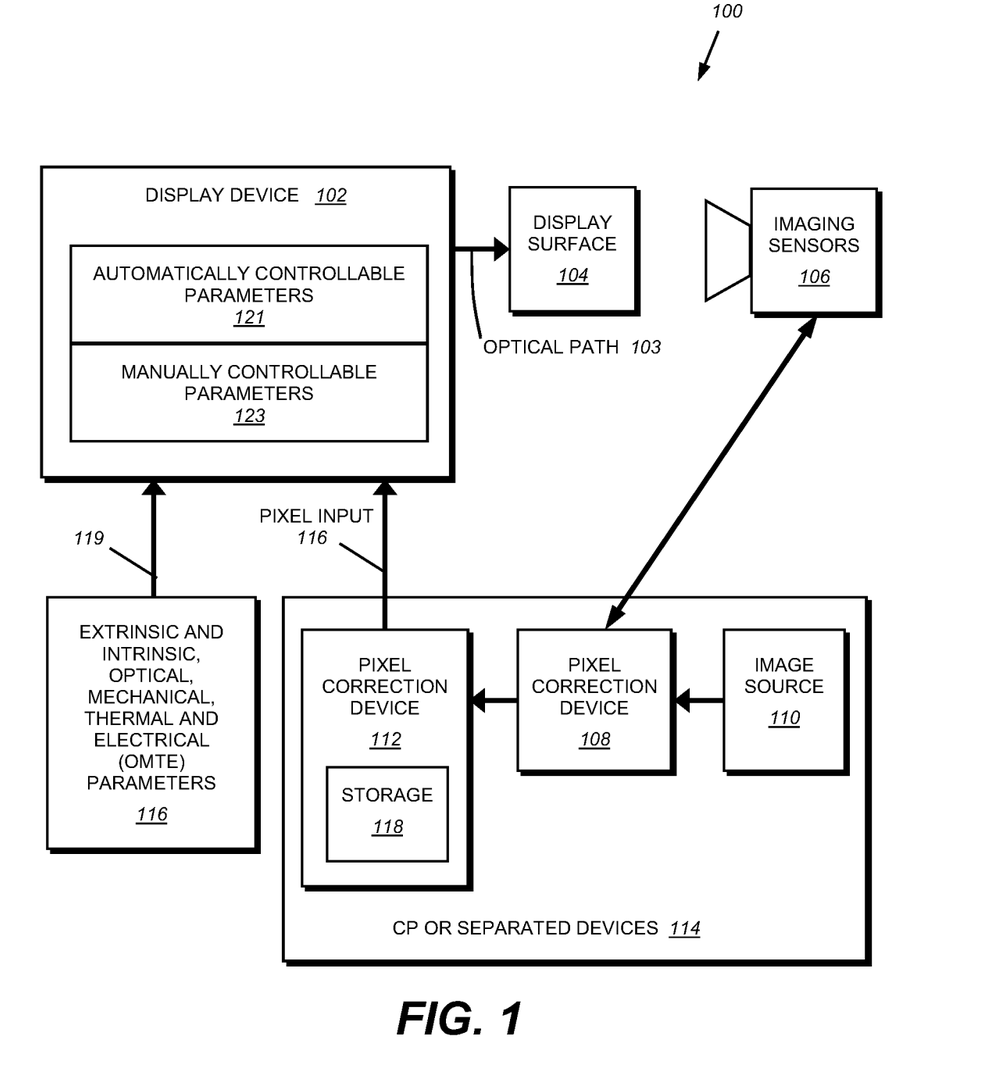
FIG. 1 is a block diagram of an exemplary display system in accordance with a generalized embodiment of this invention.

An exemplary embodiment of such a system 100, which can be employed in accordance with the teachings of this invention, is shown in FIG. 1, and corresponds in large part to that described in the above-incorporated U.S. Pat. No. 6,456,339. In general, the display device 102 (a projector array, etc.) transmits, via the optical path 103, an image to the display surface 104. The displayed image is viewed by a camera or other form of internal or external imaging sensor 106. The sensed image data is transmitted to a computation device 108 that analyzes the various portions of the image to determine relative pixel characteristics in various regions of the overall image. This data is compared to data from the ray image source 110 from which an appropriate correction to various portions of the image is achieved. The corrected image portions may correspond to all, or overlapping sections, of a given projectors discrete image. As shown, the image source, computation device and/or pixel correction device 112 may be part of a single processor/circuit (box 114) or separated into discrete, interconnected components. The resulting corrected pixel input 115 is fed to the display device 102 as shown. Correction of the display device 102 may be as well, in accordance with this invention facilitated by intrinsic and/or extrinsic optical, electronic, mechanical or thermal (OMTE) parameters that govern operation of the display device 116. This novel correction function is described further below.

Note that the positioning and orientation of the light sensor relative to the display can vary greatly and still function appropriately. For a rear-projection television, a light sensor can be in front of the display where the user would be. The sensor can also be located inside the display, to view what a user sees from behind (which could be a very distorted version of what the user sees—using a Fresnel screen for example), or viewing pixels that the user cannot see. The sensor may be positioned at a very sharp angle to the display surface.

Note that the optical path length between the display surface and the display device, in some embodiments, can be approximately zero for an emissive display, can be relatively small for an LCD display, and can be several meters for a front or rear-projected display.

Note further that in some implementations, within the optical path or in the display device itself, there may be objects inserted on purpose to optically reduce the signal. For this purpose their position and properties should be considered optical parameters controllable by the system (for example; position). Sometimes these objects, known as edge blend plates and which one can be considered part of the display device, attempt to resolve the issue that most projector blacks are not actually true black in color. That is, it could be a transmissive LCD panel that is being used to attenuate the light, or neutral density fillers put in at the edges, or mechanical or optical techniques for attenuating light at the edges. Another example is an iris that modulates the intensity of the overall display. In this case the mechanical property to be modified is the opening diameter. As with other parameters, mechanical parameters may be subject to both automatic adjustment with feedback control and manual adjustment using a third party viewer's feedback from a display or a set of data provided by the display system.

In some implementations, obstructions are blocking some or part of a display from the optical sensors. Sometimes, this is not on purpose such as in the case of a column in a building blocking part of a projector. This type of obstruction can be compensated for by an unblocked projector. Sometimes, an obstruction is purposeful. For example, the darkest possible output of a projector can often still be visible. When two projectors overlap with similar dark levels, the dark region in the overlap area is then twice as bright as the non-overlap area, making a very visible boundary. Customized baffles, gradient neutral density filters, rakes, etc. are introduced to make the black level appear more uniform to the viewer.

In some implementations, the pixel correction device 108 is combined as part of the display device 102. Since the pixel correction device can be implemented in a chip—for example a chip dedicated to warp an image—that chip could easily be included in the display device. Alternatively, the pixel correction device may be implemented as software that runs on a general computing platform, and that software and platform can be easily included in the display device. For example, the Sanyo™ Corporation provides LCD projectors with an optional card containing a warping chip available from Silicon Optix™ (San Jose, Ca). Separately, Silicon Optix creates the Image Anyplace™ box, which has largely the same chip that is in a box that sits outside the projector.

In some implementations, the computation device is part of the display device. For example, in the digital signage industry, it is standard to ship a display device with a general purpose computer that is part of the device. That computer could be used as the computational device.

In some implementations, the image source is part of the display device. For example, if a storage device is included as part of the display device, the image source could be contained in the display device. Again, in the digital signage industry, it is typical to have a storage device as part of the display device.

In some implementations, the image source may have optical, mechanical thermal and/or electrical (OMTE) properties, which may effectively be included with the display device's OMTE properties. In the example of a broadcast television signal captured through an antenna, that antenna may be part of the display device (as in a television or video signal transmitted by an IEEE 802.11 compatible signal), or simply connected (perhaps indirectly) to the display device. The antenna may have OMTE properties that are controllable, which yield image sources to the display with more or less noise (for example, the direction the antenna is pointing). The imaging sensors may detect the how the signal appears on the display surface, and adjust the antenna OMTE properties. Another example is an analog video signal entering a display device. The display device OMTE properties include the signal detector phase and clock (as well as other parameters) which may be adjusted for an optimal image to appear on the display surface. But, the phase or clock (or other parameters) of the input signal itself may also be provided so as to optimize the image on the display surface. Yet another example is an input video signal whose colors can be modified before entering the projector.

In some implementations, the pixel correction device can be absorbed into the image source. For example, an image source that is generated using computer graphics can have a number of meshed objects in it. It can be possible to pre-correct the locations and colors of the verticies in the mesh so that the resulting computer-generated images sent to the projector appear as desired on the display surface.

In some alternate implementations, one may need to employ multiple optical sensors to fully reconstruct the display quality perhaps because one sensor cannot view all the display, etc. Additionally, the computation device (108) may be a personal computer employed to drive the image-projection system. Alternatively, the computation device can be implemented as multiple PCs, and sometimes it is an FPGA, or a custom ASIC. Similarly, the pixel correction function (112) can be implemented without limitation on a personal computer (PC), FPGA, custom ASIC or another data-handling chip or device. It can be implemented as the texture mapping portion of a graphics processing unit (GPU), or other software, firmware or hardware based algorithms implemented inside the GPU. The pixel correction function can be stored at an appropriate location such as the storage space (118). If so, the pixel correction can be stored explicitly, as in a table.

Further, the display surface 104 in an implementation of the system may not be flat. In fact, the display surface could be a three dimensional object, such as a person, or a wavy screen that appears like a waving flag. Sometimes the display surface is moving, such as the sail of a ship. Sometimes the display surface is moving in a known pattern, such as a projector projecting on a moving pendulum, in which case the sensor data might need to be timed for the display surface to be in the correct position. Alternatively, the display screen can be fog, smoke or just air. More often the display surface is fixed. The display surface is often designed to be a particular shape but achieves that goal only within some tolerance. That is, the display surface may be nearly cylindrical, toroidal, elliptical or spherical. Sometimes the display surface is designed to channel light in a particular direction, such as a Fresnel screen inside a rear projection television.

The OMTE parameters (116) come in many forms. Some implementations of these parameters include "brightness" and "contrast" which in Many displays affect the intensity of each color. Some displays have lens shift, to mechanically move the lens in the projector, and some displays include mechanical positioners whose parameters can be adjusted to move the projector itself. Some displays allow you to control the voltage of the light source, or another parameter that controls the power going to the display. Some displays allow you to set color lookup tables, to correct for subtle hues. Sometimes those lookup tables are spatially varying. Some displays have tables that control the output intensity versus from the pixel value in order to get a more exact input/output curve. Or, some displays have a variety of such tables from which to choose. Some displays have temperature controls unit whose operating temperature attire might be settable. Some displays have a lens that can be focused or de-focused, or zoomed in. Some displays have extra pixels and one can set if the entire input signal is shifted slightly to the right or left. Many displays experience problems syncing properly to analog signals, and have phases and timing that can be set to sync the input signal properly to the display. There are many more parameters not mentioned here that can be set via an appropriate control or interface. For the purposes of this description the display device parameters fall generally into two categories: those that can be automatically controlled (e.g. via a serial port command, 121 in FIG. 1) and those that require manual setting (123 in FIG. 1). For the most part, the illustrative embodiment relates to the automatically controllable parameters (121).

I. Pixel Correction

Figure 5:
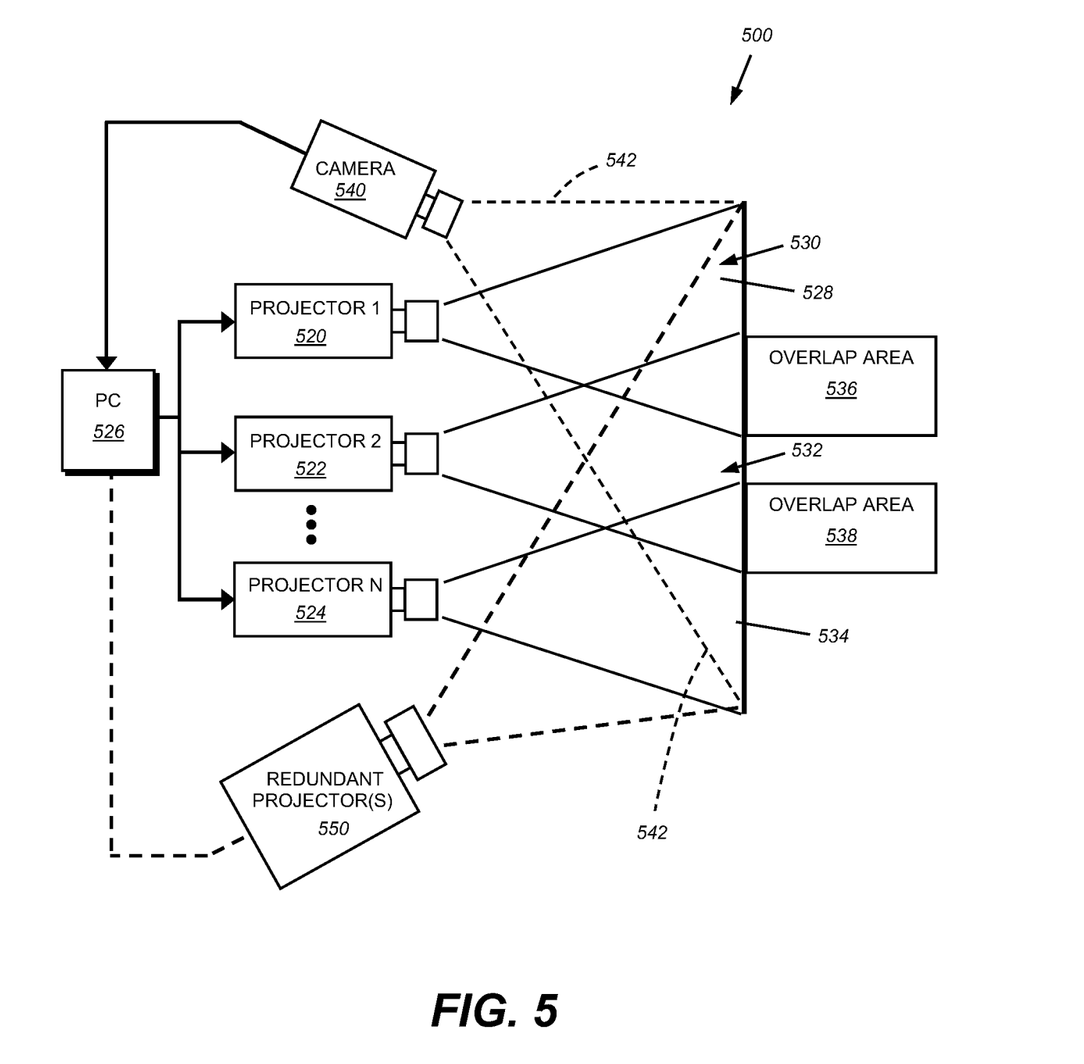
FIG. 5 is a schematic diagram of an array of ganged projection devices under control of a PC with correction application software and/or hardware in accordance with this invention forming an overlapped image on a display surface from a plurality of discrete images.
Figure 6:
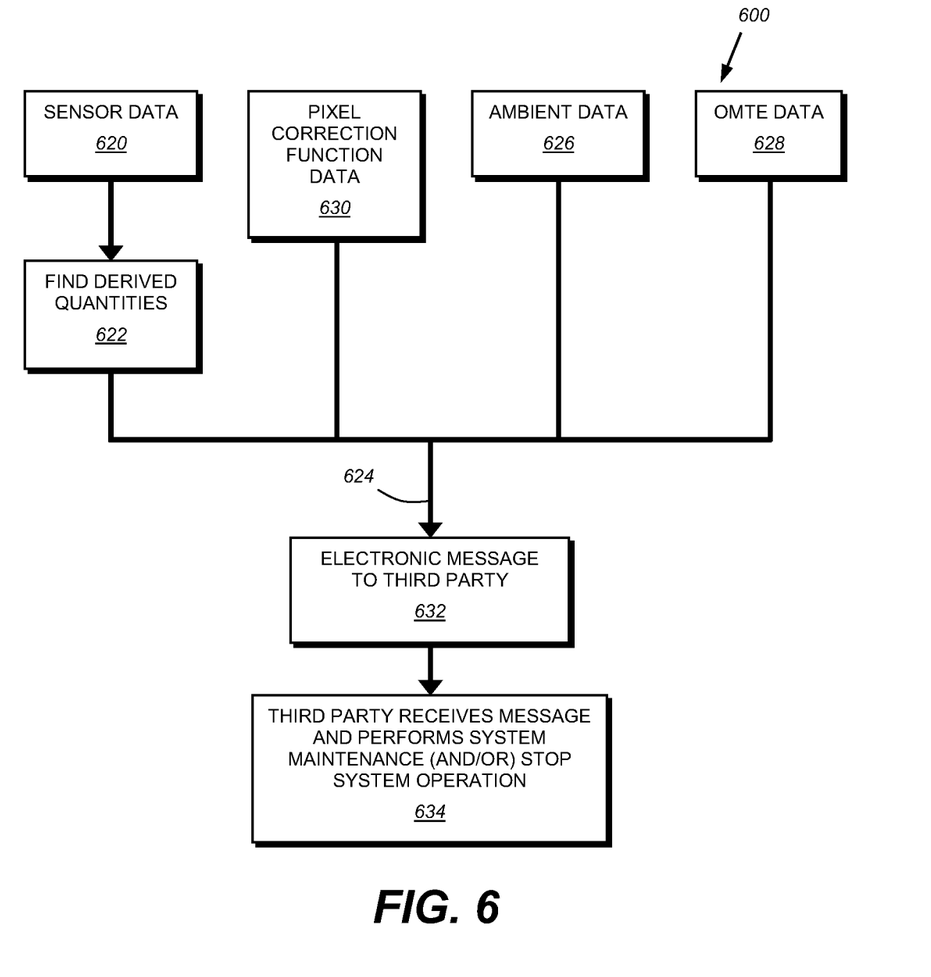
FIG. 6 is a block diagram showing the providing of data to a third party and the actions undertaken by the third party.

The derivations of the pixel correction function and the display correction function, which sets the OMTE parameters, will now be discussed in further detail. Referring further to the derivation of the pixel correction function, the above incorporated U.S. Pat. No. 6,456,339 describes in detail methods for how to sense the presence and absence of pixels, form a mapping, derive and apply the pixel correction function. Other patents and academic papers describe other techniques other ways of forming the mapping. Many of these are described and referenced in "Practical Multi-Projector Display Design" by Aditi Majumder and Michael S. Brown. By way of background, we briefly review a process for deriving the pixel correction function which follows below. Reference is also made to FIGS. 4b, 5 and 6 and the accompanying description of the above incorporated U.S. Pat. No. 6,456,339.

Generally the process of deriving the pixel correction function begins with a test pattern that is displayed on the screen, which is detected by optical sensors. Note that many patterns have been used in the academic and patent literature to sense pixels including patterns of dots, hexagons, Gaussians, sinusoids, and stripes. Sometimes the key is to detect where pixels do not land, specifically sensing the absence of pixels. Sometimes the patterns can be embedded in other content. Those patterns may be difficult for a human to see, often referred to as digital watermarks. Or, the patterns may land in portions of the screen that a camera can see but a viewer cannot. Sometimes the content that the user is displaying can be used directly as a test pattern.

Using the information from the detected test patterns, a mapping from the sensed pixels to the sensor can be found. Sometimes that mapping is sufficient. But often display quality measured is expressed relative to the display surface; for example, the specification as to where on the display surface the resultant displayed image should appear. For this case, the next step is to establish a display-surface to optical-sensors mapping for color, intensity, and position. The transform that governs the mapping may be known. Or, it can be established through the use of fiducials, and/or the known screen geometry and/or standard computer vision stereo algorithms using cameras. Though the computer vision stereo algorithms do not require the information, it is worth pointing out that often the approximate position and orientation of the display surface is known. It may be specified as simply a flat wall, or that of an arbitrary three-dimensional object for which one knows its general geometry. Perhaps the display surface is a basic shape such as a cylinder with a radius and height, or something more complex, such as a three-dimensional shape of the display surface described by (for example) triangular facets.

Note that some methods for finding the pixel correction function explicitly create screen surface to display pixel mappings and/or sensor to sensed pixel mappings. Other methods do not explicitly create these mappings, but they use quantities that someone with expertise in the state of the art could readily transform into such mapping (such as, but not limited to, using a Fourier Transform from frequency space to position space). These mappings, which use derived quantities, can be termed implicit mappings.

Generally, using the known or determined mapping from the sensors to the display surface, and the mapping from the sensed pixels to the sensors, the resultant mapping between the sensed pixels and the display surface can be found. This step is further described in above-incorporated U.S. Pat. No. 6,456,339.

Then corrections for that mapping, and for the desired colors that should appear on the display surface may be done (as in above incorporated U.S. Pat. No. 6,456,339), which generally forms the pixel correction function. Without limitation, we continue describing a method to find a pixel correction function.

Once the appropriate mapping is achieved, it is possible to set up objective functions to represent the display quality desired by a viewer. Often the objective function will take into account uniformity of color, position, and straightness of lines that should considered, etc. Often the function has spatially varying tolerances, or tolerances that allow quantities to vary, slowly as one moves along the display surface. For example, in a verbatim interpretation of the optical input, one can model the smoothness forgiveness of the eye and allow for non-uniform intensity output that, from a human eye's point of view, will appear uniform.

The pixel correction function can, thus be defined as the desired transformation of the input signal, including but not limited to transforming the color, intensity of the input, warping of the input signal and re-sampling the input signal. For example, the Red (R), Green (G), and Blue (B) pixel intensities and the intensity multiplier Alpha (R, G, B, Alpha), for each pixel can be calculated in order to maximize the quality found on the display surface. More complicated pixel correction functions will use a matrix or lookup table or other techniques to transform an input signal color (R,G,B) to a different input signal color (R,G,B). The input signal can be warped so that it is located in the correct portion of the display surface. When warping, there is a choice of re-sampling method, which can be spatially varying, which is described further below.

II. Display Quality Correction

Figure 3:
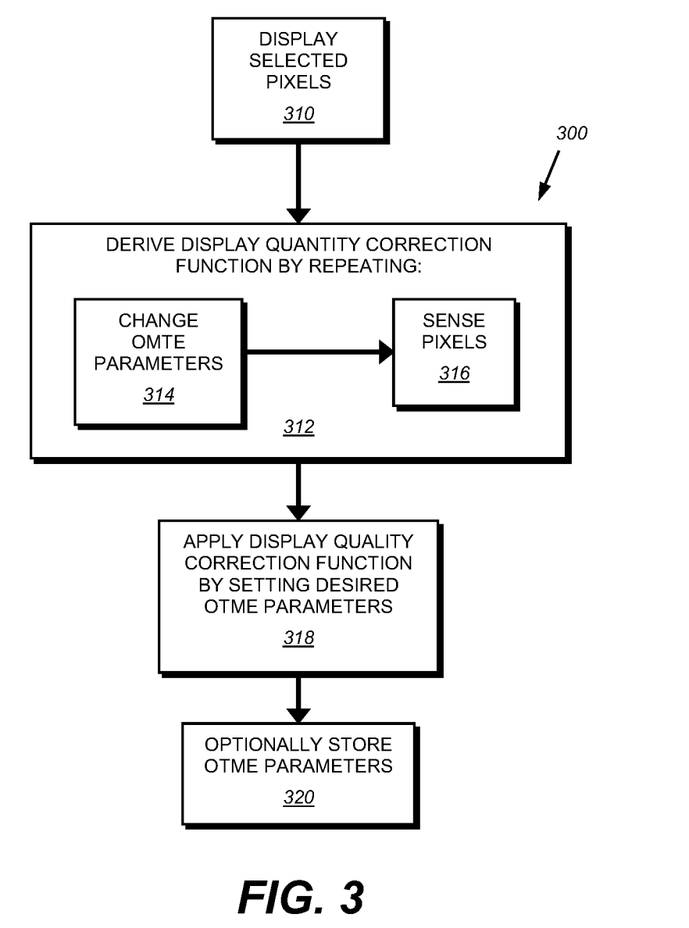
FIG. 3 is a flow diagram of a procedure for deriving the display quality correction function according to an embodiment of this invention.

FIG. 3 describes an illustrative procedure 300 for deriving and applying the display quality correction function. At least one OMTE parameter (116) is changed and the results on the display are sensed by the sensor 106. The display quality correction function is derived by taking repeated sensor measurements at different OMTE settings. The display quality correction function can be derived in many different ways. One example would be to take a predetermined number of measurements, which is shown in FIG. 3. An alternate approach is to iteratively change at least one OMTE settings until a display quality metric is maximized, which is shown in FIG. 4.

As shown in FIG. 3, the procedure 300 first selects pixels to be used in the derivation process (step 310). As with the derivation of the pixel correction function, a mapping is found from the selected pixels to the sensors. The selected pixels are used by the step 312 to derive the display quality correction function in the following manner. First at least one OMTE setting is varied from its current value in sub step 314. Based upon the changed OMTE setting on the display (102), the selected pixels are then sensed in substep 316. The steps 314 and 316 are repeated a predetermined number of times using different sets of OMTE parameters (i.e. different setting levels or different operating points). The display quality correction function is chosen by maximizing the display quality measure (i.e. the operating point where the display achieves its maximum quality). This derived quality correction function is then applied by setting the display's OMTE parameters based on those defined in step 312 at procedure step 318. The OMTE parameters are optionally stored in step 320 and as will described below the stored parameters can be used in a variety of ways to further optimize display performance. A set of OMTE settings form an operating point for the display.

Figure 4:
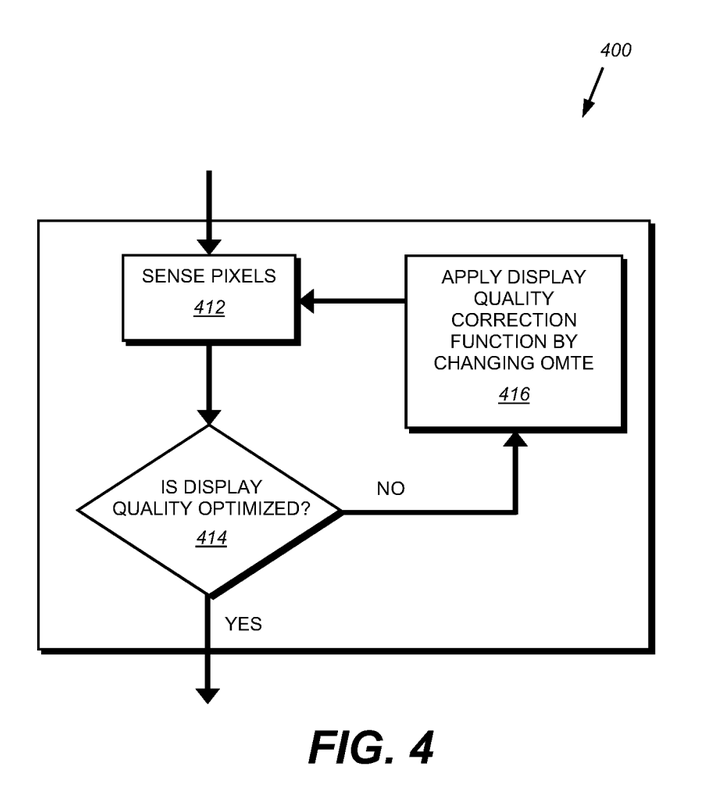
FIG. 4 is a flow diagram for describing an alternative step in the procedure of FIG. 3 for iteratively deriving the display quality correction function according to an alternate embodiment of this invention.

For the iterative method, the step 312 is substituted by step 410 in FIG. 4. In this step, the display pixels are sensed (step 412), and the sensed output is subjected to a determination as to whether a maximum display quality has been achieved (decision step 414). If the quality has not been maximized, the procedure step 410 branches to step 416 in which the display quality correction function is applied by changing the current OMTE parameters. This change in OMTE parameters can be based upon standard non-linear maximization techniques such as gradient ascent. Given the change OMTE parameters, the pixels are again sensed in step 412, and decision step 414 again determines whether quality has been maximized. When a maximum quality has been achieved, step 410 completes and above-described steps 318 and 320 (optionally) can occur.

III. Display Quality Correction and Pixel Correction

The display quality correction function and the pixel correction function can be derived in any order, or in parallel. Often, it is optimal to find the display quality correction first. That is, one may maximize the quality of the resulting corrected display by first optimizing the OMTE settings—and thus creating the best display possible—and then further optimizing with the pixel correction function. However, in some cases it may be preferable to derive them in the reverse order. It is, in fact, possible to vary OMTE parameters and pixel test patterns simultaneously, so that both function are derived simultaneously.

Figure 2A:
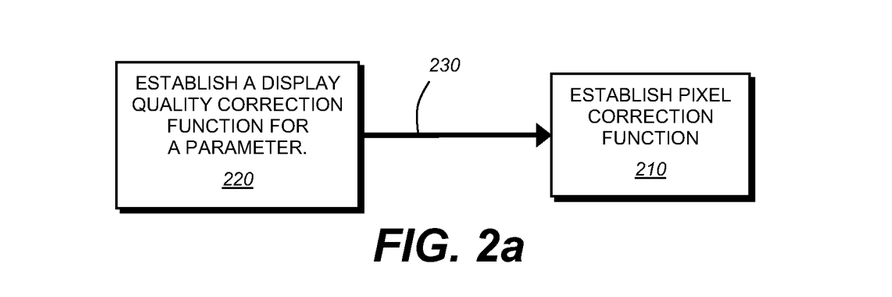
FIG. 2a is a simplified flow diagram describing the ordering of the performance of the display quality correction function procedure before the pixel correction function procedure.
Figure 2B:
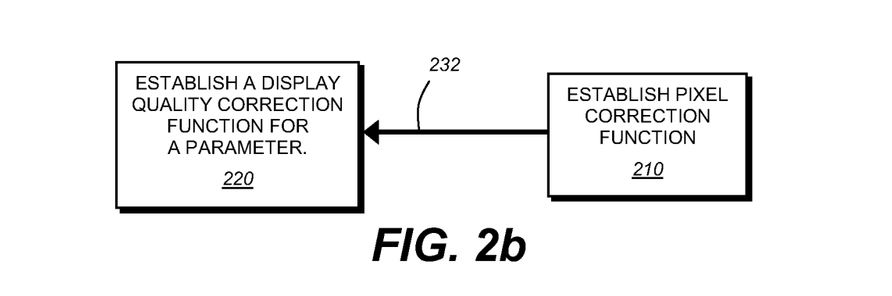
FIG. 2b is a simplified flow diagram describing the ordering of the performance of the pixel correction function procedure before the display quality correction function procedure.
Figure 2C:
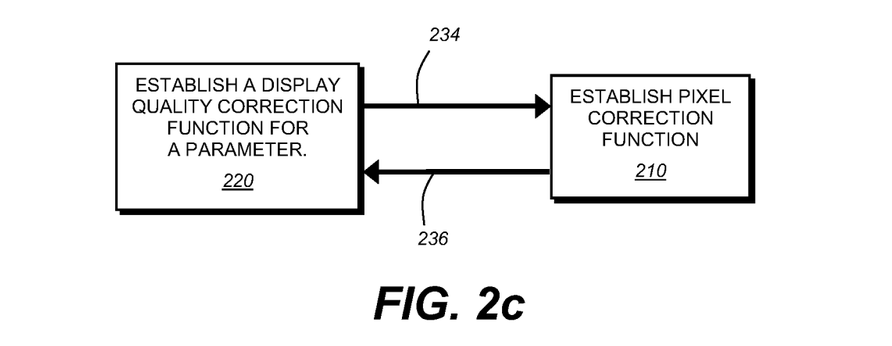
FIG. 2c is a simplified flow diagram describing the performance of the pixel correction function procedure and the display quality correction function procedure on an ongoing basis.

To further illustrate the teachings of this invention FIGS. 2a, 2b and 2c each provide basic flow charts of embodiment of the correction procedure of this invention. Reference is further made particularly to FIG. 4A of the above-incorporated U.S. Pat. No. 6,456,339, which depicts an embodiment of a pixel correction function (which may also be termed a "shader correction function"). This, or a similarly functioning procedure, is depicted in each of FIGS. 2a, 2b and 2c as the step of establishing a pixel correction function 210. As shown in each of the figures this invention contemplates the above-described step of establishing a display quality correction function for a given OMTE parameter as step 220. Uniquely, the invention combines both steps to achieve a superior picture quality within the limits of the given display system (consisting of one or more discrete display devices). In FIG. 2a, the arrow 230 indicates that the system first performs the OMTE step(s) for each parameter (step 220) and then establishes the pixel correction function (210). This can occur once. Likewise, in FIG. 2b, first the pixel correction function is established (step 210), and then (according to arrow 232), the display quality correction function (step 220) occurs.

In FIG. 2c, the steps 210 and 220 continue to occur in an ongoing fashion, once the procedure begins, as indicated by two way arrows 234 and 236. In this manner the pixel correction function and the display quality correction function are constantly updating based upon current sensed image data.

Referring again to FIG. 1, the image source (110, also called an input signal) is the content that is desired to be displayed. It is passed through the pixel correction device (112) (which applies the pixel correction function). The results of that device are sent as input to the display device (102), whose OMTE parameters have been set (119 in FIG. 1 and step 318 in FIG. 3). Driving the display with corrected pixel data is defined as input 115, which is sending the results of the pixel correction device (112) to the input of the display (102).

IV. Storage of Correction Function and Operating Points

The pixel correction function and/or the display correction function can be stored in a variety of structures, such as a lookup table (at exemplary storage location 118 in FIG. 1, and in accordance with optional step 320 in FIG. 3). Lookup tables are arranged in a variety of forms. Some possibilities include tables of numbers that represent warping or color variations on a triangle mesh (in the open GL texture map sense). A lookup table can include the coefficients used on a polynomial to warp pixels, or to modify the colors of incoming pixels. In this case, numbers can reside in a table. In another alternative, the numbers are split into small groups, which each represent a small part of the overall pixel correction function (e.g. a warping chip may locally use a small set of numbers to represent the local warp). Sometimes a lookup table has one value such as a multiplier or offset on color. Sometimes a lookup tables has one or more values as an input and one or more values as an output. For example, a lookup table for color conversion can have three color pixel values as an input and three color pixel values as an output.

Ambient conditions surrounding or inside the display may be significant to the operation and/or the desired properties of the display. For example, ambient lighting (such as sun light) that lands directly on the display can create conditions where it is desirable to have a bright display rather than a color-accurate display. Also, as the display is generally constructed from mechanical and/or electronic components, the ambient temperature and/or humidity (either inside or outside the device) can affect the performance of the display. The same or additional sensors can be used to detect ambient conditions. And, sets of OMTE parameters and pixel correction functions can be stored for use in those different ambient conditions, thereby deriving various discrete operating points. Note that any sensor collecting data can collect data while the display system is use. Or, the display system can receive and display specialized pixels to be sensed by a sensor. In accordance with the illustrative embodiment, ambient conditions can be accommodated while the display system is in use.

V. Minimizing Side Effects of the Pixel Correction Function.

In some applications, modifying the input signal using the pixel correction function has potentially undesirable side effects. As one possible example, warping and re-sampling an input signal can sacrifice high spatial frequencies. Another example is that decreasing the intensity of a projector, by decreasing the input signal, sacrifices dynamic range. By changing the OMTE parameters, one can minimize or potentially eliminate the changes needed to make to the input signal to the projector, and therefore, decrease the undesirable side effects.

In some applications, the undesirable side-effects of modifying the input signal are unacceptable in some regions of the image. In one example, the image contains text which may not respond well to re-sampling (e.g. text is designed for a perfect rectilinear grid of pixels, which is often warped when the input signal is modified). Thus, it can be undesirable to apply modifications to this region. In the illustrative embodiment, the pixel correction device (112), can be instructed to ignore the portion of the input signal that includes the region that includes the text. Or, the system may employ a different re-sampling filter on those regions. In one example, a sharpening-filter can be employed to improve the quality of possibly re-sampled text. In general, one may improve an overall quality metric by using spatially varying filters on the input signal to a display.

VI. Manually Controllable Parameters

In some cases, the OMTE parameters may not be automatically controllable but they are manually controllable (see 123 in FIG. 1). In these circumstances, it is desired to have an external operator in the feedback loop to manually modify these parameters. Without limitation, the external operator might be a human, or piece of software or mechanical device. For example, an operator might be told to move a projector in one direction so that the projected signal fully covers the screen.

VII. Redundant Display(s)

Referring to FIG. 5, an example of a ganged projector array 500 in accordance with an embodiment of this invention is shown in further detail. This example will be discussed in further detail below. In addition to a plurality of online projectors (520, 522, 524, etc.), the array 500 includes one of more redundant displays 550. That is, extra displays may be available to be used should one of the online projectors become too dim or inoperable. If processing the sensor data finds that a particular display is too dim, or causes the resulting system display quality to drop a threshold, the redundant display 550 may be automatically turned on to replace the original display—the problem display being identified by sensor measured in conjunction with the sensor-to-display mapping. In the case of self-contained displays, it may not be possible to exactly replace the original display because the original self-contained display will still remain. In the case of projectors, light from the newly turned on projector may replace the light from the old projector. In some cases, there would be one redundant projector per online projector. In another embodiment, the redundant projector's light is added to the existing pool of projectors, and the poorly performing projector is not removed from the system. In this case, the redundant project is pre-positioned to overlay a number of projectors output light so that at least some light can be least some light can be replaced from the problem display.

D. Maintaining Display Quality

In many cases, displays are expected to maintain a level of quality over time. Sensor data acquired during calibration, during operation of the display system, and while the display system is showing specialized pixels designed to be sensed by the sensors is extremely useful to a third party to verify that the display achieves a quality target. A third party can be defined without limitation as a human or a monitoring system. Referring to FIG. 6, diagram 600 describes the various forms of data made available to a third party. In some cases it may be useful to provide the sensor data directly (block 620). More commonly, it is useful to extract data from a sensor to provide to the third party (block 622). The information provided (branch 624) may include, but is not limited to, the raw sensor data (block 620), derivatives of the sensor data such as graphs, histograms and plots (block 622), ambient data (block 626), the OMTE parameters (block 628) themselves or the pixel correction function (block 630). All of this data can derive from one instant in time, or by aggregating data over time.

The following are illustrative examples of data that can be useful for maintaining a display. This includes providing information such as a display setting having been manually set when it was not supposed to, or a user moving the display (perhaps accidentally), or that a light source requires replacement. Providing plots or graphs to indicate quality across the display at the chosen display metric may also be very useful. Providing images may also be useful.

Typically the data provided to third parties is transmitted (branch 624) in the form of an electronic message (632). That may include but is not limited to a page, an electronic-mail, a text-message, an automatic-phone call, a popup window on a computer monitor, or an informational message in a monitoring system.

In some cases, from sensor data over time, it is possible to predict when the display will no longer be able to achieve its quality target. Providing data that changes over time can be a highly significant feature. The system may directly predict when light sources are not bright enough, when color ranges become too small, when various quality measures of other measures of importance will hit thresholds. The third party generally uses this message (block 632) to perform maintenance on the system as is necessary. The third party may also stop the system because it is not meeting an acceptable quality level (block 634).

E. Examples

The following are particular examples of implementations in which the teachings of the inventive concepts herein can be employed:

By way of background and further description, a typical display system is physically mounted and arranged (e.g. an array of projectors pointing at a surface or an array of self-contained displays). The displays are initially calibrated in the factory to some operating point (i.e. a predetermined setting of OMTE parameters). The sensors are also mounted in the appropriate positions. Cameras, for example, are positioned so that the ensemble can view the entirety of the entirety of the display. A calibration is performed, by which is meant that the pixel correction function and the display correction function are derived in a manner described above. The sensors can record the ambient lighting and the quality of the display—usually the overall brightness, intensity uniformity and color uniformity. The display is then put into operation. A sensor can then continuously record data about the display, and warn third parties when the display may need maintenance or a re-calibration. Re-calibration can occur as needed, on a periodic basis, or at the behest of the user. In some illustrative systems, various corrections occur during normal operation in accordance with the sensor data and measurement of ambient conditions as also described above.

In one example, the display can be an LCD display, and the electronic parameters (part of the OMTE) that can be adjusted can include the shader correction units that set the DC offsets for each section of a 20×20 grid to provide uniformity, and the imaging sensor is part of an in-factory calibration system. Following this coarse adjustment, localized color distortions are corrected with the derived pixel correction function. The goal for the system is to provide a display of uniform color and intensity.

Figure 7:
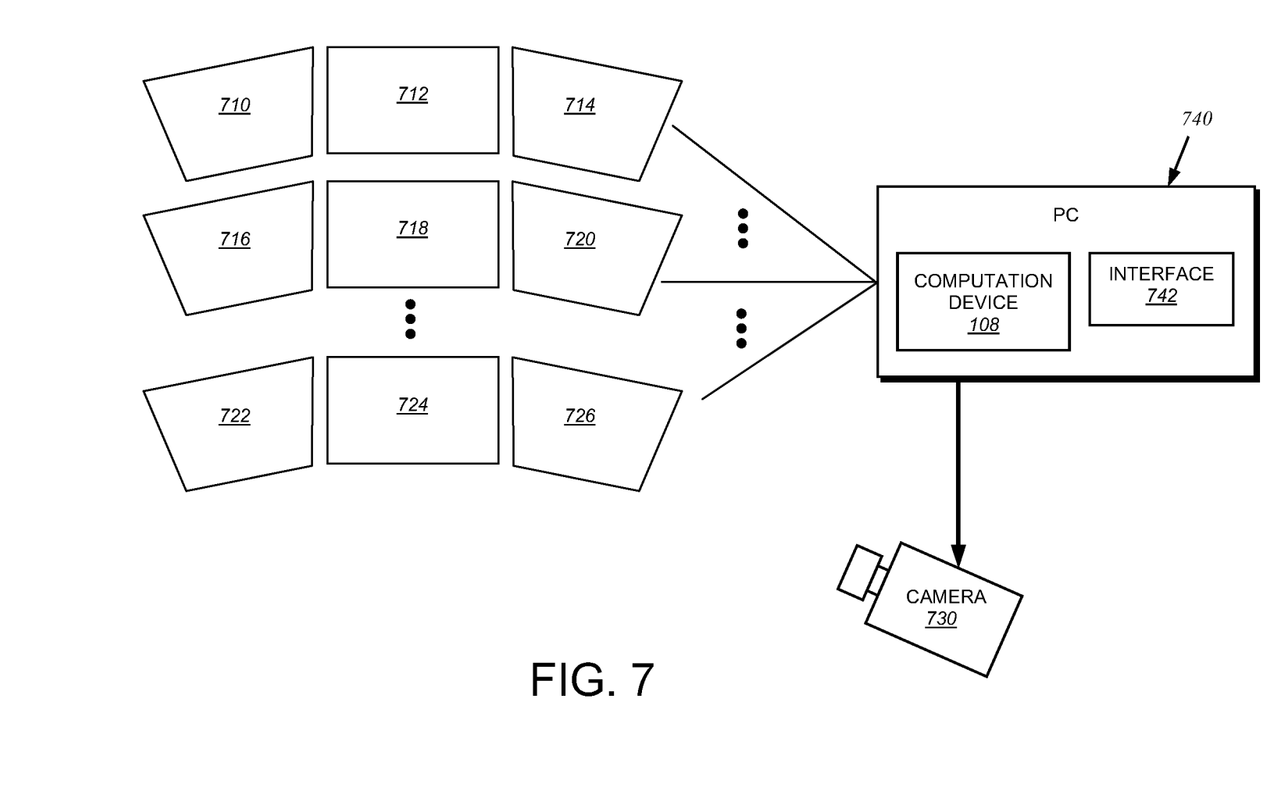
FIG. 7 is a schematic diagram of an array of ganged self-contained displays under control of a PC with correction application software and/or hardware in accordance with this invention forming an overall image.

In another example a plurality of self-contained displays (710, 712, 714, 716, 718, 720 . . . 722, 724, 726) are arranged as an M×N video wall (in this example M=3) such as shown in FIG. 7. A personal computer 740, or other processing device (with appropriate video interface 742) forms the computation and pixel correction device (See FIG. 1, 108, 112). Again, imaging sensors such as a camera 730 or multiple cameras can correct a global color and brightness for each display to be largely similar to the next. This novel step calibrates display's to each other, rather that separately, one at a time. The OMTE parameters are the brightness and contrast per color channel of each display. Additionally, if possible, a shader correction might be used optimized to provide uniformity across the arranged self-contained displays. Optionally, pixel-level correction can be performed to correct for the remaining color imperfections. The goal of this system is to provide a display of uniform color and intensity across all the self-contained displays.

In the same example, the arrangement of LCD panels can define the shape of a curve such as a cylinder, as can be desirable in the simulation industry. In this case, the input signal can require correction for the perspective view of a desired viewpoint, called a frustum view. Camera(s) 730 can determine the exact position of each self contained display, and the pixel correction function includes a warp of an input signal to appear appropriate from the desired viewpoint. That input signal is stored on the PC 740 or generated during run time.

In another example, the imaging sensors can view an LCD panel optimized for high-dynamic range imaging where there can be a backlight composed of 1000 individual LEDs, whose light output can be modulated individually and based on the content to provide more brightness resolution over and above the contrast provided by the opacity of the LCD. An in-factory system can calibrate uniformity for varying intensity level (OMTE parameters), and also provide finer grain color correction for any remaining optical non-uniformity (pixel correction function).

In another embodiment, the display is a projector, the display surface is a flat screen that is front or rear-projected, and the OMTE display parameters are the color temperature, contrast and brightness. The pixel correction function will align the image with the screen outline and further provide color correction to remove any color or geometrical defects in the screen. The goal of this system is to provide straight lines in a grid pattern and align the pattern to the boundaries of the display surface and provide uniform color and intensity across the display surface.

In still another example, the display is a plurality of projectors that are edge-blended (e.g. the boundaries of projected signals overlap), the display surface is arbitrary. Referring now in further detail to the example of FIG. 5, the projectors (1-N) 520, 522, 524, Which receive corrected image data from a PC 526 are nearly completely overlapped (stacked) and may be positioned off axis to the display surface 528. The respective fields of view 530, 532 and 534 of each projector 520, 522, 524 display a small overlap area 536 and 538 therebetween. This area exhibits a blending of projected images. Likewise each of the projected images may be rotated relative to the others, vary in color, contrast and brightness, and differ in size/shape due to relative angle of attack of the image with respect to the screen 528. The off-axis camera 540 views the entire image field (dashed lines 542) and delivers currently viewed image data from the overall screen back to the PC 526 for processing. As a result of the processing, the OMTE display parameters are varied to provide the best resolution and color and pixel correction function color tuning for each projector 520, 522, and 524 so as to provide the best quality display.

In particular, the OMTE parameters include the color temperature and the brightness and contrast to compensate for the inter-light source differences, the position and orientation of the projectors, and the placement of optical baffles to increase the contrast ratio by further dimming out the Hack levels in the overlap regions. The pixel correction function achieves more refined brightness and color uniformity. For black levels this is termed pedestal equalization, but at any intensity, one may desire to ensure uniform intensity.

In the same example, determining of the pixel correction function and/or display correction function is sometimes performed without baffles in place and such baffles are later added. This procedure renders the determination of the correction functions more robust by increasing the signal to noise ratio of the detected signal. In this case the choice of function may be made based on the expected effects of the baffles. Or, after the baffles are in place, more sensor data can be collected to account for the affects of the baffles.

In the same example, an object may be temporarily added during calibration to help the calibration process. For example, consider the system being rear projected with a camera on the same side of the screen as the projectors, and the display surface designed to reflect minimal light backwards toward the camera. In this case, the camera may see detect little light and may therefore have difficulties calibrating robustly. To improve the determination of the correction functions, one may temporarily add an object in front of the display which directs light back towards the camera. In one embodiment, paper covering the screen effectively provides sufficient light for the camera to view.

In another embodiment of FIG. 5 the display surface is flat and is moving with a periodic motion from side to side. In the case of a known motion of a display surface, sensor data is collected at appropriate times in the motion in order to derive the projector to display surface, or projector to sensor mapping.

In yet another embodiment related to the system of FIG. 5, the OMTE parameter of interest is the lens shift. The camera is used to lens-shift all the projectors to the correct relative positions with respect to each other. The resulting formed image is defined by the component image of each projector. One possible goal is to align all the projected images on top of each other. Another possible goal is to overlap the projected images by a set quantity of pixels. If necessary, the input pixels to the projectors are further warped to obtain further improved alignment.

Another example provides the ability to increase the lifetime of the display. The OMTE parameters include the voltage level provided to each of the light sources (light bulbs/LEDs/lasers/eta Potentially, the voltage level is set to 0 volts causing the light source to be set to an off state. The OMTE parameters can in this case allow the system to reduce the intensity of the light source to afford longer lifetime. The decision to reduce the intensity of the light source is based ambient light conditions measured through the light sensor.

In yet another example with a projector, the key concern is focus. Some projection displays employ liquid lenses, which have focus that is adjustable using OMTE parameters. The focus can be optimized for the center of an image, or the outside of the image. The OMTE parameters can be automatically adjusted to the desired quality measure—which is typically the best focus in the center. If needed, the input signal can further be warped to adjust to correct for any barrel or pin-cushion or other distortion of the lens.

In a further example of the same system, each projector has a warping chip and or a color rotation chip, embedded in it so that the pixel-correction device is part of each projector.

In a further example of the system implementation, with an M×N grid of rear projected projectors illuminate a screen and nearly completely overlap each other. In this case the goal is to create a stereo display, where viewing from a particular direction yields an image primarily from one projector. This entire system including the screen can be placed in an enclosure so that the image sensors, computation device, pixel correction device, (the entire system) all comprise an integral of one unit.

In another example of a group of projectors who light output covers a screen, the screen is a cylindrical screen, with a known height and radius, and a Spain of 300 degrees. In this case each camera together with a projector to form a stereo pair. While determining the mapping between the sensor and the selected pixels, correspondences between the projector and the camera are found. From this information, the location of the screen can be determined using standard stereo computer vision algorithms. For a cylinder screen, there are height and angle ambiguities which can be resolved by several methods including restricting the detected spots to those on the screen. Fiducials on the screen or user-selected points may be added to assist the machine vision algorithm. An increasing number of spots can be projected and detected until the screen is located within a desired tolerance, or the additional information of the new spots does not change the determined location of the screen within a desired tolerance.

The same system can be used with multiple cameras. In this case, each pair of cameras, which can observe the same pixels from a projector, form a stereo pair. Then, geometrical correction can be made as suggested above. And, projectors/cameras form a stereo pair. Note that cameras and other optical sensors can drift slightly in time due to temperature and other electronic drift within the device. It is therefore useful to have pairs of cameras detecting the same pixels from a projector. The system can use the information detected by both cameras to transform from the color space of one camera to the color space of the next. If the cameras are placed so that all information can be transformed into a common color space, the projectors can then be calibrated from that common color space (By way of background, a variation on this type of procedure can bee found in a document by Ilie and Welch: *Ensuring Color Consistency across Multiple Cameras*, Technical Report TROS-011 at the University of North Carolina). The goal of the system is to have color uniformity and geometric alignment to the display surface.

In another example of a group of projectors whose light output covers the screen, the screen geometry is "nearly" a cylinder—that is, a cylinder with possible defects or aberrations. In this case, stereo computer vision algorithms can be used as described in the above paragraph to map out the screen. In this case, it may be advantageous for the projector to project many patterns of spots in order to collect enough data to map out any defects in the screen using a camera. In this case, a predictor/corrector-type algorithm can be used where the measured locations of the spots in the camera are used to predict where future spots will be found. If the future spots are found within tolerance of the predicted location, then enough correspondences between the camera and projector have been found to allow the system to correct for any defects in the screen. This is an iterative method for determining the pixel correction function. A different way to accomplish the same goal is to use striping methods. In this method, alternating liner and finer stripes of black and white pixels in the horizontal (and then vertical direction) are projected and detected so that the end result is that the mapping between every pixel in each projector and each camera is known. In this case, all correspondence information has been collected which maps out the screen as well as is necessary for the projector.

In another example relating to FIG. 5, using an array of projectors and one or multiple cameras, the desired resulting display provides an image corrected to a particular perspective viewpoint, often referred to as "view frustum". If the screen geometry is not known, using computer vision stereo-based methods, the geometry of the screen can be measured. For this case, often the input signal is a simulated scene, rendered using OpenGL for example. The pixel correction is performed so that a viewer looking from a particular location sees a perspective view of that scene. This goal can be accomplished using trigonometry, and calculating where each simulated pixel should be so that the appropriate view frustum is accomplished.

In the above example, cameras and projector lenses can exhibit distortions. That is, the lenses are not correctly modeled by simple pin-hole models. Standard machine-vision stereo algorithms may not be sufficiently robust to handle these distortions. By parameterizing the distortion (such as radial distortion) in a non-linear minimization (such as a Levenberg-Marquart algorithm), the system can find the positions and orientations of the cameras, projectors, their lens distortion properties and the shape of the screen. The non-linear minimization does so by minimizing the squared difference between the prediction of such a model and the observations of correspondences and fiducials of the cameras. Often an initial step to seed the minimization is to ignore the distortions, or heuristically determine initial positions and orientations of the cameras and projectors. Once seeded, the algorithm iteratively converges to a solution for the distortion parameters and the positions and orientations of the cameras and projectors.

It should be noted that a key issue that affects display quality is the incorrect syncing to the video signal timings. A sensor can observe the jitter, missing pixels, moiré patterns, color shifts and other issues that occur because of incorrect timings. As defined above, video timings are MITE parameters and may be corrected using the display correction function described herein.

As discussed above, the use of fiducials makes forming the sensor-to-display surface or camera-to-display surface mapping more robust and accurate. Fiducials take many forms including embedded LEDs in the display surface, or infra-red or UV marks projected onto the display surface. Exemplary fiducials can also take the form of laser-illuminated spots with a known position on the three-dimensional surface. Visible fiducials, sometimes with specific color or reflectivity can also be used. For example, reflective patches around the display screen can be readily detected by a camera—when hit by projector light, these patches are an effective technique to provide useful fiducials. These fiducials can be patterned, or can be colored (e.g. have dissimilar reflectivity/transmission spectra relative to the surrounding screen), or be discernable by shape. For both front and rear-projection display devices, dome shaped objects provide particularly good fiducials, because light received from most directions is reflected in many directions, and is therefore easily visible. A fiducial may also be temporarily placed on the display at a predetermined location (such as a template) and then removed after calibration.

Having described an exemplary pixel correction procedure according to an illustrative embodiment, the following is a more detailed description of color and intensity correction involving feedback:

By way of background, the characteristics of certain display technologies (e.g. LCD panels) are such that there is significant non-uniformity in the intensity of light output over the display area. In addition, there are sometimes many light sources, and each light source varies its performance differently with time or temperature. Moreover, most projection displays exhibit illumination falloff in the optical system, which results in a gradual decline in brightness as one moves further away from the optical center of the projected image. Theoretically, the light intensity typically falls off as the fourth power of the cosine of the of axis angle. Intensity variations that may be caused by this falloff are known as vignetting. A sensor can also experience vignetting within its optical system. Hence, this invention provides an intensity correction system to address these challenges. The system contemplates two methods to correct for vignetting: an "open loop" and a "closed loop" method. The closed loop method is iterative in that the pixel correction function and the display quality correction function are updated, the affects of the update measured, and then both corrections functions are modified again. In the open loop method, sensor measurements directly determined the correction functions.

1. Open loop method (no feedback)

In general, the method contemplates the application of appropriate weighting functions to compensate for vignetting in the overlap region of two projectors. Weighting functions are further described in detail in the above incorporated U.S. Pat. No. 6,456,339

In a seamless multi-projector system, one must compensate for the nonlinear nature of the display output as well as vignetting effects in the projector if the intensity is to appear uniform across the blend region. Display nonlinearity is commonly modeled using a power law of the form Output intensity=(Input intensity)$^\gamma$, where a typical value for $\gamma$ is 2.5. If one were to ignore vignetting, the inputs of two overlapping projectors could then be blended using corrected weighting functions of the form $w_1(x)=x^{1/\gamma}$ and $w_2(x)=(1-x)^{1/\gamma}$, where x varies from 0 to 1 over the blend region.

When vignetting is present, the edges of the blend region are often noticeably darker because of the intensity fall off at the edges of the projector. The open-loop method de-emphasizes a projector's light contribution near the edge by using weighting functions of the form $w_1(x)=F(x)^{1/\gamma}$ and $w_2(x)=(1-F(x))^{1/\gamma}$, where F(x) has the following minimum properties:

F(0)=0, F(1)=1
F'(0)=0, F'(1)=0

The zero first derivatives ensure that the weights near the edges are small. Two function that satisfy the criteria are (a) Hermite polynomial: $F(x)=x^2(3-2x)$ and (b) Sinusoidal: $F(x)=(1-\cos(\pi x))/2$. Other functions satisfying the overall criteria may also be used.

2. Closed loop method (with feedback)

In the closed loop method, the system compensates for a wider variety of spatial intensity variations by iteratively correcting the intensity of a multi-projector display based on camera feedback. When the closed loop method is applied to an edge-blended display system, the system:

(a) determines how the combined projector outputs should appear to the camera once the intensity correction procedure has been applied. This involves forming a target image from the camera's perspective, based on camera images of the individual projector outputs. The target image formation process must account for vignetting effects in the camera and it must ensure that the target image can in fact be achieved when the projector outputs are combined using fractional weights.

(b) iterates the weighting function that is applied to each of the projectors until the combined output from the projectors (as observed by the camera) agrees with the target image formed in step (a). At every iteration, the weighting function should satisfy one or more constraints:

i. The weighting function should monotonically increase from 0 (minimum intensity) to 1 (maximum intensity) with no abrupt changes.

ii. The sum of the weighting functions for all the projectors should be unity.

iii. Flatness conditions (zero derivatives) can be imposed on the weighting function as in the open loop case.

A specific example of the closed loop method is to perform edge blending when a precise number for $\gamma$ is not known a priori. In this case, the procedure starts with a blend function that is known to underestimate the intensity e.g. $w^{(0)}(x)=F(x)$ (which sets $\gamma=1$). Here the system relies on the fact that $\gamma$ is always greater than unity, so that F(x) does not exceed $F(x)^{1/\gamma}$. At iteration k, the weighting function $w^{(k)}(x)$ is obtained from the previous iteration using a power law of the form $w^{(k)}(x)=[w^{(k-1)}(x)]^{1/\Delta}$, where $\Delta$ is a number between 1 and a typical $\gamma$ value, $\Gamma$. In fact, if $\Delta$ is chosen to be the Nth root of $\Gamma$, then the weighting function after N iterations will be $w^{(N)}(x)=F(x)^{1/\Gamma}$, which would be the desired weighting given a priori knowledge of $\Gamma$. In practice, a logarithmic search yields the desired weighting function in only a few iterations.

The closed loop feedback system for intensity correction is not limited to one-dimensional blend functions. The method also applies in 2D and it need not be confined to the blend region. This extension of the methods allow for the system's feedback intensity correction method to also be used to correct spatial non-uniformity, such as is found in LCD panels.

An illustrative embodiment of a closed loop system is exemplified by an M×N grid of projectors attempting to display a solid white image of uniform intensity and color. The system uses the open-loop method to make an initial guess on how to set the gross OMTE display properties (display quality correction function) of each display and then iteratively performs changes to the input signal (pixel correction function) u until the displayed signal on the screen is in fact a uniformly intense color.

Another embodiment of the feedback system is employed for the digital correction of projector black levels. Since black level refers to the lowest light intensity that a projector can produce, the key difference in this method is that the black level should be elevated slightly before any attenuating weight function can be applied.

A further refinement is for the method to target a particular color balance amongst projectors, thereby addressing component color intensity differences. For example, balancing the intensity of all red pixels across all projectors.

Furthermore with regard to altering parameters as above one may follow a similar approach for color balancing as is discussed in U.S. Pat. No. 5,381,349, the teachings of which are expressly incorporated herein by reference, in which the system throws up patches to measure, and also as in the above-incorporated U.S. Pat. No. 6,456,339. Here the system of the illustrative embodiment varies the display OMTE parameters related to color such as red contrast, red brightness, green contrast, green brightness, blue contrast, blue brightness. A further improvement may be to use this variation of RGB brightness and contrast in conjunction with the photometric objective functions as discussed in U.S. Pat. No. 7,038,727 (the teachings of which are expressly incorporated herein by reference), and set the operating point of the projectors as close as possible then do further refinements in the pixel correction function.

In such an implementation, it is desirable to calibrate the optical sensors against a standard calibration source. In one embodiment, the system employs a camera imager illuminated by a remotely positioned, unfocussed halogen lamp point source, which has the appearance of a uniform light source.

The foregoing has been a detailed description of illustrative embodiments of the invention. Various modifications and additions can be made without departing from the spirit and scope if this invention. Each of the various embodiments described above may be combined with other described embodiments in order to provide multiple features. Furthermore, while the foregoing describes a number of separate embodiments of the apparatus and method of the present invention, what has been described herein is merely illustrative of the application of the principles of the present invention. For example, additional correction steps can be employed beyond those described herein. These steps may be based particularly upon the type of display device and display surface being employed. In addition it is expressly contemplated that any of the procedures and functions described herein can be implemented in hardware, software, comprising a computer-readable medium consisting of program instructions, or a combination of hardware and software. Accordingly, this description is meant to be taken only by way of example, and not to otherwise limit the scope of this invention.

What is claimed is:

1. A system for projecting light onto a surface, comprising:
   a projector assembly comprising a plurality of projectors configured to project light onto the surface, wherein a first projected light from a first projector at least partially overlaps with a second projected light from a second projector resulting in an overlap region;
   a sensor assembly configured to detect a presence or absence of light pixels in the overlap region; and
   a processor configured to adjust at least one of an intensity characteristic or color characteristic of the projector assembly based at least in part on the detected presence or absence of light in the overlap region.

2. The system of claim 1, wherein the sensor assembly comprises at least one of: a camera; a linear array of light sensors; or a photo-diode.

3. The system of claim 1, wherein the sensor assembly is configured to detect infrared, ultraviolet, or visible light.

4. The system of claim 1, wherein the sensor assembly comprises a camera configured to sense a three-dimensional geometry.

5. The system of claim 2, wherein the sensor assembly is configured to detect at least one of color, intensity, or spatial information.

6. The system of claim 1, wherein the surface comprises at least one of a display surface or a screen.

7. The system of claim 1, further comprising at least one of a customized baffle, gradient neutral density filter, or a rake.

8. The system of claim 1, wherein the processor comprises a pixel correction device, implemented as a chip, configured to:
   generate a first mapping between the sensed light pixels and the sensor assembly;
   generate a second mapping between the surface and the sensor assembly with respect to at least one color, intensity, or position; and
   generate a third mapping between the sensed light pixels and the surface.

9. The system of claim 8, wherein the processor is further configured to generate a pixel correction function defined as a transformation of an input signal to the projector assembly, the pixel correction function transforming at least one of color, intensity, warping, or re-sampling of the input signal.

10. The system of claim 9, wherein the pixel correction function transforms red, green, and blue pixel intensities of the input signal.

11. The system of claim 9, wherein the pixel correction function transforms an intensity multiplier for each pixel of the input signal.

12. The system of claim 1, wherein the processor is configured to:
   generate a first mapping between the sensed light pixels and the sensor assembly;
   generate a display quality correction function based upon the first mapping between the sensed light pixels and the sensor assembly.

13. The system of claim 1, wherein the first projected light comprises a first light pattern and the second projected light comprises a second light pattern.

14. The system of claim 1, wherein the plurality of projectors are configured to project ultraviolet light onto the surface.

15. A system for projecting light onto a surface, comprising:
   a projector assembly comprising a plurality of projectors configured to project ultraviolet light onto the surface, wherein a first projected light from a first projector at least partially overlaps with a second projected light from a second projector resulting in an overlap region;
   a sensor assembly configured to detect a presence or absence of ultraviolet light pixels in the overlap region; and
   a processor configured generate a pixel correction function defined as a transformation of an input signal to the projector assembly, the pixel correction function transforming at least one of color, intensity, warping, or re-sampling of the input signal.

16. A method, comprising:
   projecting a first UV light pattern onto a surface with a first projector of a projector assembly;
   projecting a second UV light pattern onto the surface with a second projector of the projector assembly such that the second UV light pattern at least partially overlaps with the first UV light pattern, thereby defining an overlap region;
   sensing a presence or absence of UV light pixels on the surface;
   generating a pixel correction function defined as a transformation of an input signal to the projector assembly, the pixel correction function transforming at least one of color, intensity, warping, or re-sampling of the input signal.

* * * * *